United States Patent
Borovicka et al.

(10) Patent No.: US 9,560,937 B2
(45) Date of Patent: Feb. 7, 2017

(54) COOKING UTENSIL WITH FLAVORING INFUSER

(75) Inventors: Cory Thomas Borovicka, Oakland, CA (US); Sharon Ellen Kallenberger, Oakland, CA (US)

(73) Assignee: Charcoal Companion Incorporated, Emeryville, CA (US)

(*) Notice: Subject to any disclaimer, the term of this patent is extended or adjusted under 35 U.S.C. 154(b) by 0 days.

(21) Appl. No.: 13/346,653

(22) Filed: Jan. 9, 2012

(65) Prior Publication Data

US 2012/0174799 A1 Jul. 12, 2012

Related U.S. Application Data

(60) Provisional application No. 61/430,920, filed on Jan. 7, 2011.

(51) Int. Cl.
*A47J 43/18* (2006.01)
*A47J 37/07* (2006.01)
*A47J 37/04* (2006.01)

(52) U.S. Cl.
CPC ........ *A47J 43/18* (2013.01); *A23L 5/19* (2016.08); *A47J 37/049* (2013.01)

(58) Field of Classification Search
USPC ....... 99/345, 346, 347, 421 V; 403/353, 263, 403/348, 349
See application file for complete search history.

(56) References Cited

U.S. PATENT DOCUMENTS

| | | | | |
|---|---|---|---|---|
| 2,643,581 A * | 6/1953 | Wehrenfennig | ............ | 396/531 |
| 4,313,050 A * | 1/1982 | Abenaim | ............ | A47J 36/34 126/24 |
| 4,653,708 A * | 3/1987 | Rich | ............ | 248/27.1 |
| 5,301,602 A * | 4/1994 | Ryczek | ............ | A47J 43/18 99/345 |
| 5,577,858 A * | 11/1996 | Kasim et al. | ............ | 403/316 |
| 5,624,167 A * | 4/1997 | Katz | ............ | 312/223.1 |
| 5,752,604 A * | 5/1998 | Hayman | ............ | 206/534 |
| 6,039,162 A * | 3/2000 | Marsic | ............ | 192/108 |
| 6,062,131 A * | 5/2000 | Holland | ............ | 99/345 |
| 6,398,179 B1 * | 6/2002 | Soles | ............ | 248/617 |
| 6,520,464 B1 * | 2/2003 | Morrissey et al. | ............ | 248/222.52 |
| 6,557,460 B2 * | 5/2003 | Hester | ............ | 99/347 |
| 6,779,438 B1 * | 8/2004 | Citynell et al. | ............ | 99/347 |
| 7,063,007 B2 * | 6/2006 | Citrynell et al. | ............ | 99/347 |
| 7,934,607 B2 * | 5/2011 | Henderson et al. | ............ | 211/26 |
| D639,601 S * | 6/2011 | Borovicka et al. | ............ | D7/354 |
| 8,444,001 B1 * | 5/2013 | Dawson | ............ | A47G 19/06 206/217 |
| 2004/0187699 A1* | 9/2004 | Citrynell et al. | ............ | 99/345 |

(Continued)

*Primary Examiner* — David Angwin
*Assistant Examiner* — John J Norton
(74) *Attorney, Agent, or Firm* — Beeson Skinner Beverly, LLP

(57) ABSTRACT

A utensil 10 for flavoring fowl while cooking it over a heat source such as a barbecue has a pan-shaped base 53 with having an infuser cup 77 extending upward from the center portion 65 of the pan base. The infuser cup is sized to receive a standard beverage can that may be placed therein to provide a desired infusing liquid. The infuser cup can be detachably secured to the pan base by cooperative engagement of downwardly extending key tabs 89 on the bottom end 81 of the infuser cup into key tab receiving slots 69 located in the center portion 65 of the pan base 53.

16 Claims, 5 Drawing Sheets

(56) References Cited

U.S. PATENT DOCUMENTS

| | | | |
|---|---|---|---|
| 2006/0057267 A1* | 3/2006 | Dow et al. | 426/524 |
| 2006/0267300 A1* | 11/2006 | Shea | B65F 1/1468 280/33.998 |
| 2007/0090566 A1* | 4/2007 | Westhoff et al. | 264/274 |
| 2007/0283948 A1* | 12/2007 | Broom | A47J 43/18 126/369 |
| 2011/0186668 A1* | 8/2011 | Seidler | A47J 27/004 241/98 |

* cited by examiner

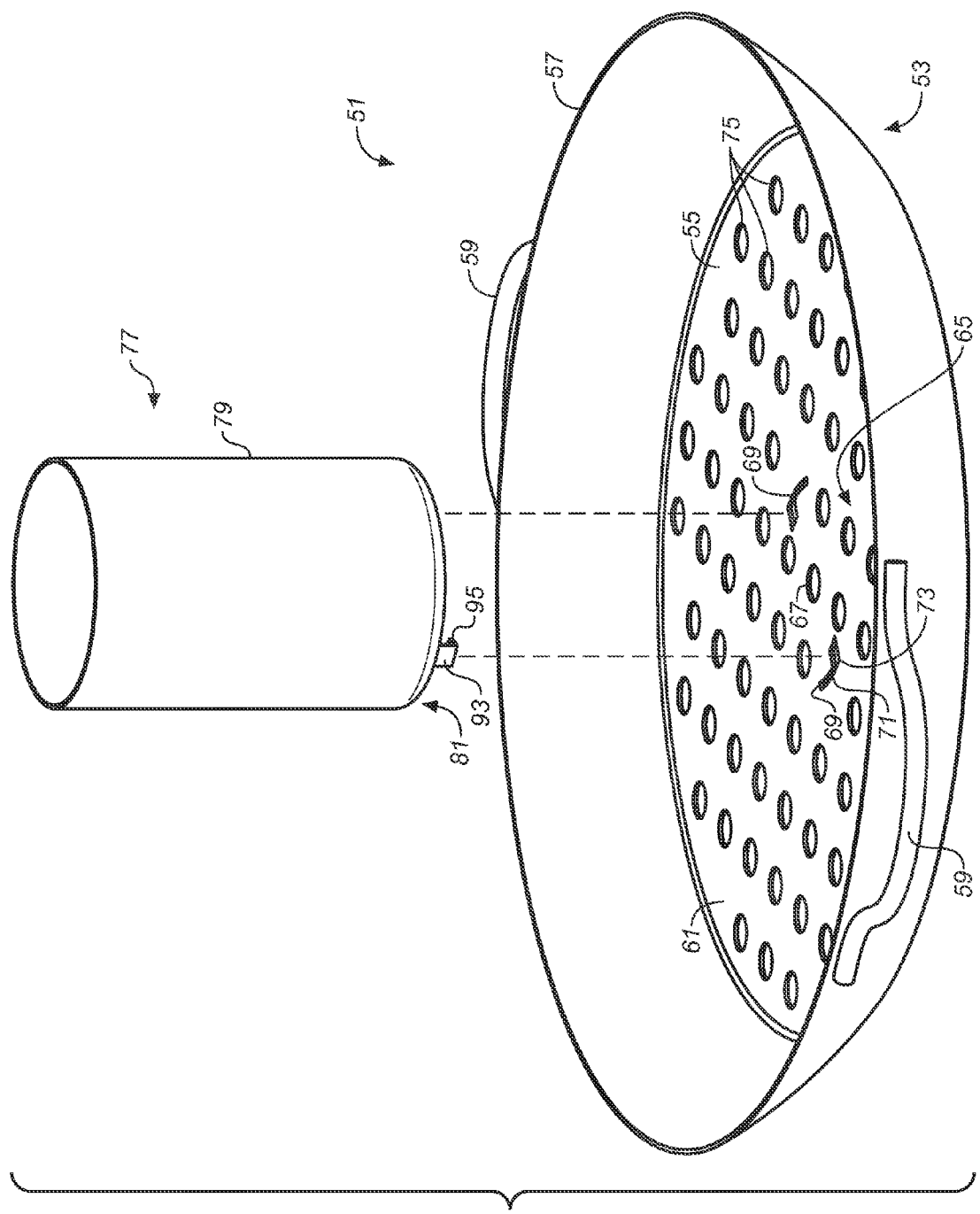

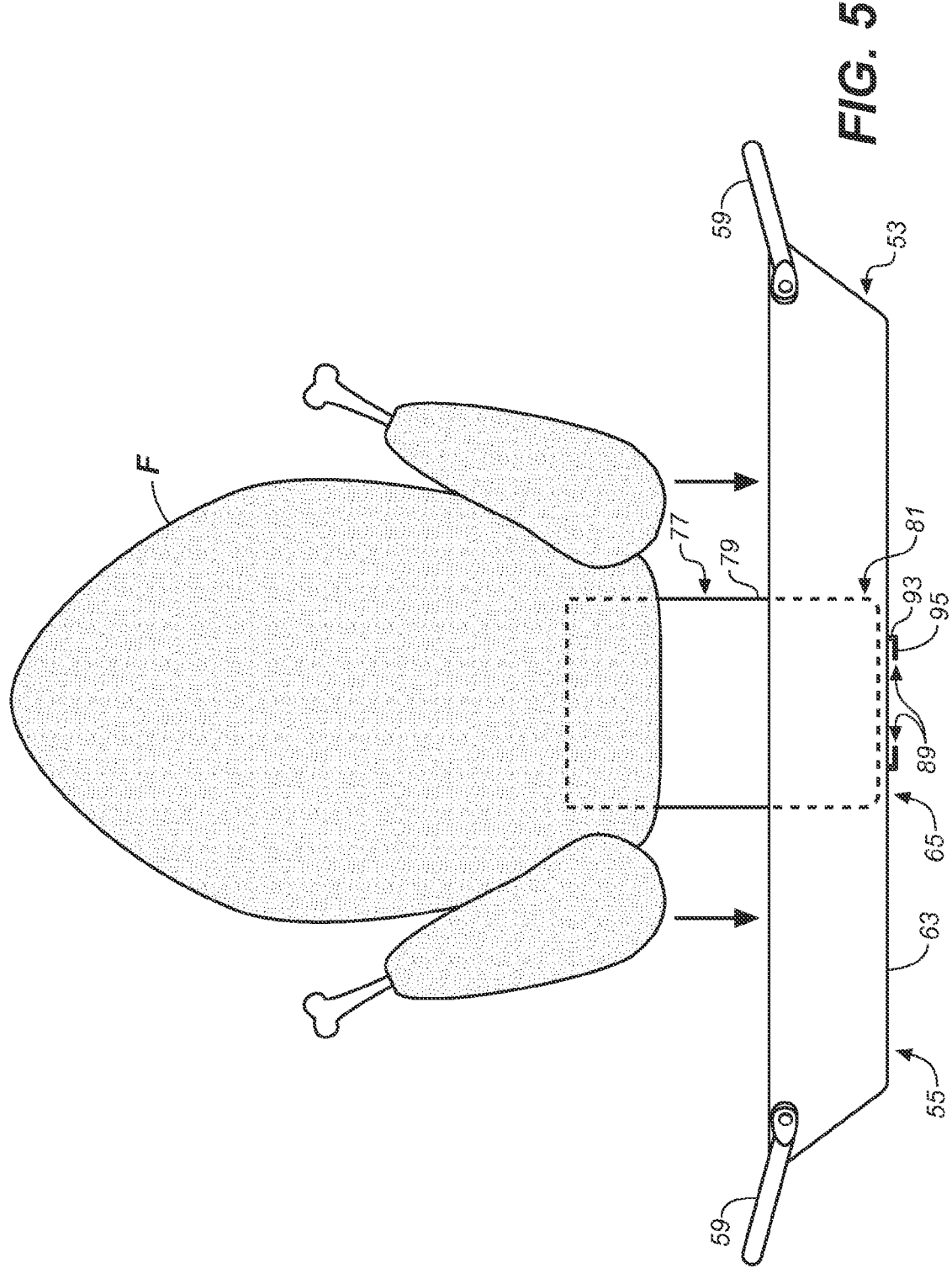

COOKING UTENSIL WITH FLAVORING INFUSER

CROSS-REFERENCE TO RELATED APPLICATION

This application claims the benefit of U.S. provisional application No. 61/430,920, filed Jan. 7, 2011, which is incorporated herein by reference

BACKGROUND OF THE INVENTION

The present invention generally relates to cooking utensils of the type commonly used to barbecue chicken or other fowl, and particularly relates to cooking utensils capable of holding a flavoring liquid which can be vaporized and infused into the fowl as it is being cooked.

A well-known technique for flavoring chicken and other fowl as it is being cooked on the barbecue or other cooking apparatus, is to add a flavoring liquid that can be vaporized and conducted up into the body cavity of the fowl during the cooking process. One common technique is to place the back end of the fowl down onto an open beer can set onto a cooking plate or pan such that, when the beer in the can is vaporized by the heat of the cooking apparatus, it infuses the meat surrounding the body cavity of the fowl with a characteristic flavor imparted by beer. Other techniques for infusing a steam or vapor into the body cavity of the fowl involve special infusing devices or stands which provide a liquid holding container for the flavoring liquid and an infuser tube onto which the fowl is placed. One such device is disclosed in U.S. Pat. No. 6,779,438 which illustrates a steamer-smoker grilling device for fowl comprised of a pyramid shaded grilling base, a liquid holding cup insertable in the base, and a straight-sided cylindrical infuser tube that screws onto the top of the base. When the base of the grilling device is heated, flavoring liquid placed in the cup inside the base is vaporized and conducted through the attached infuser tube into the body cavity of a fowl placed over the tube.

U.S. Pat. No. 6,062,131 issued to Robert Holland discloses yet another example of a heretofore known apparatus for infusing a flavoring vapor into the body cavity of a chicken or the like while it is being cooked. In the Holland patent, a cylindrical infuser tube is provided that fits into a top opening of a roasting stand having downwardly sloped walls. A bottom cap is welded onto the bottom of the infuser tube to permanently enclose the bottom end of the tube so that it can hold an infuser liquid.

The foregoing devices have a relatively complicated construction and either cannot be broken down for ease of shipment or storage, or are relatively difficult to assemble and disassemble.

SUMMARY OF THE INVENTION

Briefly, the present invention provides a cooking utensil with a tall flavoring infuser cup that can be easily removed for storage or shipment and that is easily installed. The cooking utensil, which can be used for cooking and flavoring fowl, is comprised of a pan base having a substantially flat bottom. An elongated liquid holding infuser cup is separately provided. The liquid holding cup has a set of key tabs extending downwardly from its bottom end, which are arranged for cooperative alignment and engagement with a set of key tab receiving slots located in the center portion of the bottom of the pan base. The infuser cup can be detachably secured to the pan base by downward insertion of the key tabs into the key tab receiving slots in the pan base and the rotation of the cup so as to move a vertical part of each key tab into a narrow slot portion of each key tab receiving slot and capturing a horizontal part of each key tab under the bottom of the pan base. The infuser cup is tall enough for supporting a fowl during cooking when inserted into the body cavity thereof.

In one aspect of this embodiment, a positioning post depending from the bottom of the infuser cup is sized for fitting into a positioning hole in the bottom of the pan base for providing a rotational axis for the infuser cup when rotatably locking the key tabs into the key tab receiving slots. In another aspect of the invention, a contact plate is provided on the bottom of the infuser cup and has less surface area than the bottom of the infuser cup. This reduced surface area minimizes friction between the bottom of the cup and the pan base, and facilitates attachment of the infuser cup to the pan base.

The cooking utensil in accordance with the invention is suitable for holding a fowl to be flavored by favoring liquid supplied by the tall infuser cup and small items of food to be cooked around the fowl. The cooking utensil can be easily and quickly converted to use without the flavoring liquid infuser cup as desired.

DESCRIPTION OF THE DRAWINGS

FIG. 1 is an exploded upper perspective view of a cooking utensil according to the invention in accordance with the invention.

FIG. 5 is another side elevational view thereof showing a fowl being place over the infuser cup of the cooking utensil.

DETAILED DESCRIPTION OF THE ILLUSTRATED EMBODIMENT

Figure 3:
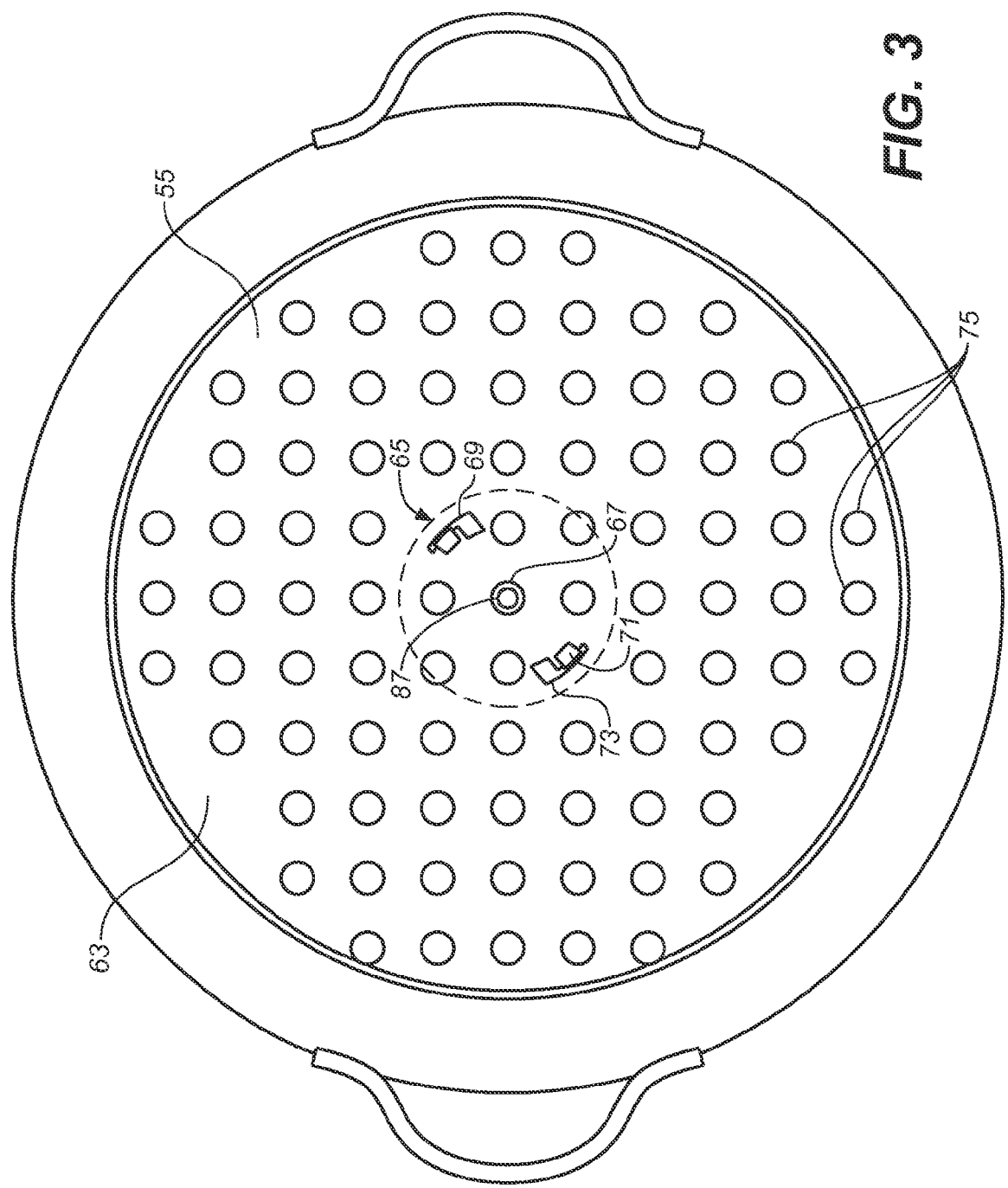
FIG. 3 is a bottom plan view of thereof the cooking utensil shown in FIG. 1.

Referring now to the drawings, a cooking utensil 51 includes a generally pan-shaped base 53 for holding food items to be cooked. The pan base 53 has a flat bottom 55, an upturned rim 57, and can have a pair of opposed gripping handles 59 extending from the rim 57. The bottom 55 of the pan base has a top side 61, a bottom side 63, and a center portion 65 indicated generally by the dotted line in FIG. 3. A centering hole 67 and a set of key tab receiving slots 69 are provided in the center portion of the bottom of the pan base. Each key tab receiving slot 69 can generally be L-shaped having an inwardly curved slot portion 71 and a wider opening 73 at one end of the slot. Optionally, multiple perforations 75 may be provided on the bottom 55 of the pan base 53 to allow juices generated during the cooking process to escape.

Figure 4:
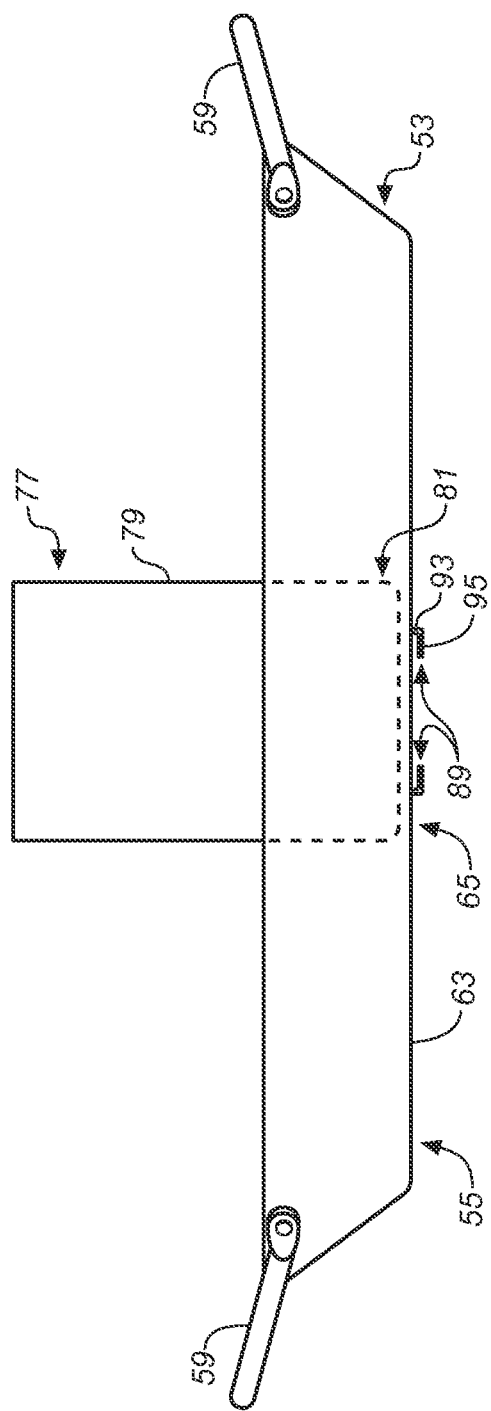
FIG. 4 is a side elevational view thereof.

The cooking utensil 10 also includes a removable tall infuser cup 77, which can be removably attached to the center portion 65 of the pan base 53. The infuser cup 77 has upright sidewalls 79 terminating at an open top end, and has a closed bottom end 81. The infuser cup is also tall enough to project above rim 57 of the pan base as shown in FIGS. 4 and 5. Generally, the cup should project above the rim of the pan base a sufficient distance to allow a fowl, such as a chicken, to be set onto and supported by the infuser cup and so that the top of the cup will insert into the cavity of the fowl. The diameter of the tall infuser cup 77 may vary, but should be small enough to allow a fowl to fit over the cup. While the infuser cup 77 is preferably cylindrical in shape, it is understood that the infuser cup 77 could have other shapes, such as square or hexagonal cross-profiles, and it is not intended that the invention be limited to the particular shape of the infuser cup 77 illustrated in the drawings.

A contact plate 83 is preferably attached to and has a surface area less than that of the bottom surface 85 of the bottom end 81 of the infuser cup 77. During rotation of the infuser cup on the pan base 53, discussed in greater detail below, the reduced surface area of the contact plate 83 relative to the bottom end 81 of the infuser cup 77, minimizes friction and facilitates attachment of the infuser cup 77 to the pan base 53.

A positioning post 87 is also preferably provided on the infuser cup. In the illustrated embodiment, this post extends downwardly from the contact plate 83 and is sized to be received in the centering hole 67 of the pan base 53. This post provides an axis about which the infuser cup can be rotated as described below.

Figure 2A:
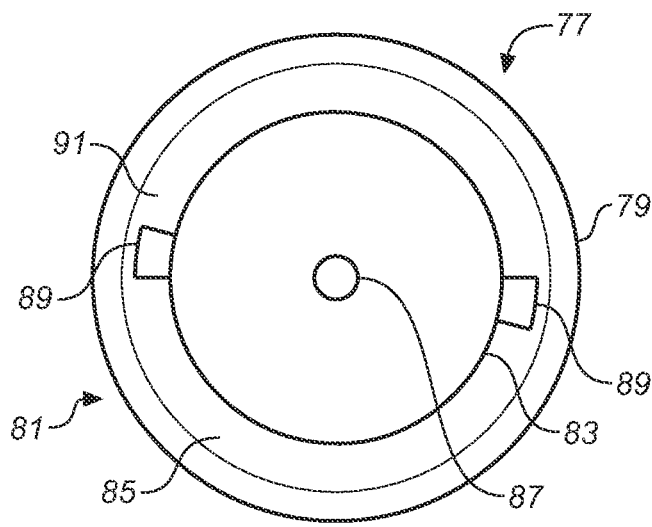
FIG. 2A is a bottom plan view of the infuser cup of the cooking utensil shown in FIG. 1.
Figure 2B:
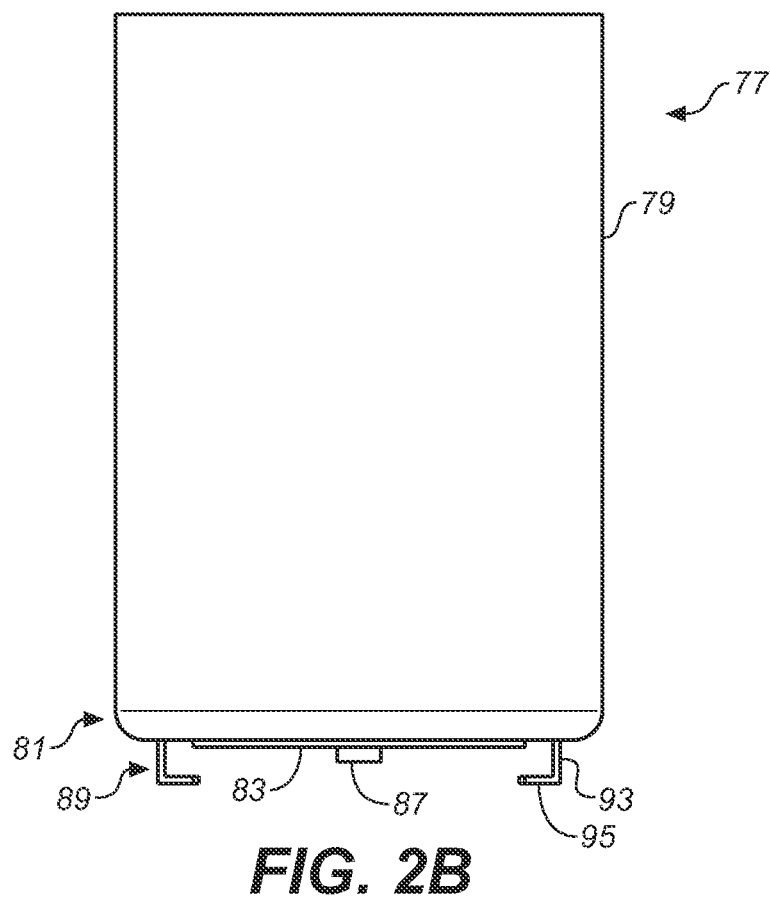
FIG. 2B is a side elevational view thereof.

A set of oppositely disposed key tabs 89 extend downwardly from the outer portion 91 of the bottom end 81 of the infuser cup 77. The key tabs 89 are arranged to align with the key tab receiving slots 69 in the center portion 65 of the bottom 55 of the pan base 53. Each key tab 89 suitable has a generally L-shaped profile (see FIG. 2B) provided by substantially flat vertical part 93 and an in-turned horizontal part 95. The vertical part 93 extends downwardly from the bottom end 81 of the infuser cup 77 and the horizontal part 95 extends inwardly from the lower end of the vertical part 93.

The pan base 53 and infuser cup 77 are fabricated from known thermally conductive materials, and can be constructed from punched or cut pieces of sheet metal and spot-welded in the desired configuration. The infuser cup 77 is constructed to be leakproof to be capable of holding a liquid.

The infuser cup 77 is attached to the pan base 53 by holding the infuser cup 77 in an upright position over the center portion 65 of the pan base 53, aligning the horizontal part 95 of each of the key tabs 89 directly over the openings 73 of the key tab receiving slots 69, and aligning the positioning post 52 over the centering hole 67 in the pan base 53 as best shown in FIG. 1. Then horizontal parts 95 of key tabs 54 are inserted into the opening 73 of the key tab receiving slots 69, and the positioning post 87 is inserted into the centering hole 67 to center the infuser cup 77 in the pan base 53. Next, the infuser cup 77 is rotated clockwise about the positioning post 87, which serves as a rotational axis, such that the vertical parts 93 of the key tabs 89 slide into the curved slot portions 71 of the key tab receiving slots 69, thereby locking the horizontal part 95 of each key tab 89 under the bottom side 63 of the pan base 53, and thereby securing the infuser cup 77 on the pan base 53. The infuser cup 77 is easily detached by rotating it counterclockwise until horizontal parts 95 of key tabs 89 are brought back into vertical alignment with the enlarged openings 73 of key tab receiving slots 69, and pulling the infuser cup upward to remove the key tabs 89 from the key tab receiving slots 69.

To use the cooking utensil 10, the infuser cup 77 is attached to the pan base 53 as above-described and filled with a flavoring liquid such as beer, wine, soda, or stock. As shown in FIG. 5, a fowl F is placed rear end first over the top of the infuser cup 77 of the utensil, such that the fowl is supported in a vertical position on the infuser cup 77 for cooking, and such that the infuser cup is inserted into the inner cavity of the fowl. Vegetables, herbs, and other food items (not shown) can be placed on the bottom 55 of the pan base 53 to cook alongside the fowl As the flavoring liquid in the infuser cup 77 heats up and starts to vaporize, the fowl will be infused with the flavor of the liquid, and the other food items surrounding the fowl will absorb the drippings from the fowl during the cooking process.

It will be understood that the pan base 53 can be used either with or without the infuser cup 77 to cook food items placed in the pan base 53 thereby adding flexibility to the utensil 51.

The cooking utensil 51 also has the benefit that it can be efficiently packaged in stackable containers by laying the infuser cup 77 on its side, in or next to the relatively flat pan base 53.

A cooking utensil 10, as described and shown, provides an improved utensil 10 for cooking fowl while infusing the body cavity of the fowl with a desired flavoring, and simultaneously providing a cooking surface for other food items which are flavored by the drippings from the fowl mounted on an infusing liquid infuser cup. While the invention has been described in considerable detail in the foregoing specification and the accompanying drawings, it will be understood that it is not intended that the invention be limited to such detail, except as may be necessitated by the following claims.

What we claim is:

1. A cooking utensil for cooking and flavoring fowl comprising:
   a pan base having a substantially flat thin-walled horizontal bottom and an upturned rim, the bottom having a center portion having at least one key tab receiving opening, and
   an infuser cup configured to hold a flavoring liquid and configured to support a fowl to be cooked by insertion into the body cavity thereof, said infuser cup having a bottom end and upright side walls, said bottom end having at least one downwardly extending key tab configured for cooperative locking engagement with at least one key tab receiving opening,
   wherein said infuser cup can be quickly secured onto the substantially flat bottom of said pan base by inserting and locking said at least one key tab into said at least one key top receiving opening thereon in a rotating motion and can be quickly released from said pan by unlocking said key tabs from said key tab receiving slots in a counter-rotation motion and lifting the infuser cup out of said key tab receiving slots and away from said pan.

2. The cooking utensil of claim 1 wherein:
   the bottom end of said infuser cup has a set of downwardly extending key tabs, and the substantially flat bottom of said pan base has a set of key tab receiving openings corresponding to the downwardly extending set of key tabs on the bottom end of said infuser cup.

3. The cooking utensil of claim 1 wherein:
   the bottom end of said infuser cup has a downwardly extending positioning post, and
   the center portion of the substantially flat bottom of said pan base has a centering hole sized to receive said positioning post,
   such that said positioning post, when received in said centering hole, forms a vertical axis for rotation of said infuser cup.

4. The cooking utensil of claim 3 wherein:
   said bottom end of said infuser cup includes a bottom surface having a downwardly extending contact plate for seating said infuser cup on the bottom of said pan base, said bottom surface spaced from the bottom of said pan base by said contact plate.

5. The cooking utensil of claim 4 wherein:
said contact plate has a diameter smaller than the bottom surface of the bottom end of said infuser cup forming a relatively small contact surface to facilitate rotation of said infuser cup when seated on said pan base.

6. The cooking utensil of claim 1 wherein:
said at least one key tab has a vertical part depending from the bottom end of said infuser cup and an in-turned horizontal part spaced from said bottom end, and
the at least one key tab receiving opening in the substantially flat bottom of said pan base is configured to receive the horizontal and vertical parts of the at least one key tab depending from the bottom of said infuser cup and to provide locking engagement therewith when the infuser cup is rotated.

7. The cooking utensil of claim 1 wherein:
said infuser cup has a substantially cylindrical shape.

8. The cooking utensil of claim 1 wherein:
said sidewalls of said infuser cup are tall enough to support the fowl during cooking when inserted into the body cavity thereof.

9. The cooking utensil of claim 1 wherein:
said sidewalls are sized and shaped to receive and hold a beverage can.

10. The cooking utensil of claim 1 wherein:
said bottom of said pan base has a plurality of perforations.

11. The cooking utensil of claim 1 wherein:
said bottom of said pan base has a perimeter area surrounding said center portion, and said perimeter area has a plurality of perforations.

12. A cooking utensil for cooking and flavoring fowl comprising:
a pan base having a substantially flat thin-walled horizontal bottom and an upturned rim, the bottom having a center portion having a set of L-shaped key tab receiving slots, and
an infuser cup configured to hold a flavoring liquid and configured to support a fowl to be cooked by insertion into the body cavity thereof, said infuser cup having a bottom end and upright side walls, said bottom end having a set of downwardly extending key tabs each having a vertical part depending from the bottom end of said infuser cup and an in-turned horizontal part spaced from said bottom end, and
said key tab receiving slots each having a substantially rectangular portion sized for receiving said horizontal part of one of said key tabs and a slot portion for receiving said vertical part of one of said key tabs,
wherein said infuser cup can be detachably quickly secured onto the substantially flat bottom of said base pan by downwardly inserting the horizontal part of said key tabs on the bottom end of said infuser cup into the rectangular portion of said key tab receiving slots in the substantially flat bottom of said pan base such that said horizontal parts are positioned below the bottom of said pan base, and then by rotating said infuser cup to insert the vertical parts of said key tabs onto the slot portions of said key tab receiving slots, thereby locking said key tabs into said key tab receiving slots, and said infuser cup can be quickly released from said pan by unlocking said key tabs from said key tab receiving slots in a counter-rotation motion and lifting the infuser cup out of said key tab receiving slots and away from said pan,
wherein said infuser cup can be quickly secured onto the substantially flat bottom of said pan base by inserting and locking said at least one key tab into said at least one key top receiving opening thereon in a rotating motion and can be quickly released from said pan by unlocking said key tabs from said key tab receiving slots in a counter-rotation motion and lifting the infuser cup out of said key tab receiving slots and away from said pan.

13. A cooking utensil for cooking and flavoring fowl comprising:
a pan base having a substantially flat thin-walled horizontal bottom and an upturned rim, the bottom having a center portion and a bottom surface, said center portion having a centering hole and a set of L-shaped key tab receiving slots, and
an infuser cup configured to hold a flavoring liquid and configured to support a fowl to be cooked by insertion into the body cavity thereof, said infuser cup having a bottom end and upright side walls, said bottom end having a downwardly extending positioning post and a set of downwardly extending key tabs, said positioning post sized for insertion into said centering hole such that when received in said centering hole said positioning post forms a vertical rotational axis for said infuser cup, each said key tab having a vertical part depending from the bottom end of said infuser cup and an in-turned horizontal part spaced from said bottom end,
said key tab receiving slots each having a substantially rectangular portion sized for receiving said horizontal part of one of said key tabs and a slot portion for receiving said vertical part of one of said key tabs,
wherein said infuser cup can be quickly secured onto the substantially flat bottom of said pan base by downwardly inserting the horizontal part of said key tabs on the bottom end of said infuser cup into the rectangular portion of said key tab receiving slots in the substantially flat bottom of said pan base until said horizontal parts are positioned below the bottom of said pan base, and then by rotating said infuser cup about said vertical rotational axis to insert the vertical parts of said key tabs into the slot portions of said key tab receiving slots and capturing said horizontal parts below the bottom of said pan base, thereby locking said key tabs into said key tabs receiving slots, and said infuser cup can be quickly released from said pan by unlocking said key tabs from said key tabs receiving slots in a counter-rotation motion and by lifting the infuser cup out of said key tabs receiving slots and away from said pan.

14. The cooking utensil of claim 13 wherein:
said sidewalls of said infuser cup are tall enough to support the fowl during cooking when inserted into the body cavity thereof.

15. The cooking utensil of claim wherein:
said sidewalls are sized and shaped to receive and hold a beverage can.

16. The cooking utensil of claim 13 wherein:
said bottom of said pan base has a plurality of perforations.

* * * * *